US012042443B2

(12) United States Patent
Ramanath

(10) Patent No.: US 12,042,443 B2
(45) Date of Patent: Jul. 23, 2024

(54) SYSTEM AND METHOD TO CONTROL MULTIPLE INPUTS PROVIDED TO A POWERED WHEELCHAIR

(71) Applicant: Rajeev Ramanath, San Jose, CA (US)

(72) Inventor: Rajeev Ramanath, San Jose, CA (US)

( * ) Notice: Subject to any disclaimer, the term of this patent is extended or adjusted under 35 U.S.C. 154(b) by 434 days.

(21) Appl. No.: 17/484,332

(22) Filed: Sep. 24, 2021

(65) Prior Publication Data

US 2022/0096290 A1 Mar. 31, 2022

Related U.S. Application Data

(60) Provisional application No. 63/083,122, filed on Sep. 25, 2020.

(51) Int. Cl.
*A61G 5/04* (2013.01)
*A61G 5/10* (2006.01)

(52) U.S. Cl.
CPC ............. *A61G 5/04* (2013.01); *A61G 5/1051* (2016.11); *A61G 2203/14* (2013.01); *A61G 2203/22* (2013.01); *A61G 2203/30* (2013.01)

(58) Field of Classification Search
CPC .... A61G 5/04; A61G 5/1051; A61G 2203/14; A61G 2203/22; A61G 2203/30
USPC ............................................................ 701/70
See application file for complete search history.

(56) References Cited

U.S. PATENT DOCUMENTS

| | | | | |
|---|---|---|---|---|
| 8,386,159 B2 * | 2/2013 | Takenaka | B62K 11/007 | 180/21 |
| 8,423,231 B2 * | 4/2013 | Breuer | B60T 17/221 | 340/901 |
| 8,622,166 B1 * | 1/2014 | Torres-Muniz | A61G 5/1051 | 180/218 |
| 8,655,564 B2 * | 2/2014 | Breuer | B60T 7/22 | 701/70 |
| 8,706,332 B2 * | 4/2014 | Kume | B62B 3/001 | 701/22 |
| 9,636,265 B2 * | 5/2017 | Furuta | A61G 5/04 | |
| 11,154,442 B1 * | 10/2021 | Dean | A61G 5/1051 | |
| 11,681,293 B2 * | 6/2023 | van der Merwe | G05D 1/0255 | 701/24 |
| 2007/0016328 A1 * | 1/2007 | Ziegler | B60R 19/483 | 318/609 |
| 2009/0055020 A1 * | 2/2009 | Jeong | G05D 1/0274 | 901/50 |

(Continued)

*Primary Examiner* — Kurt Philip Liethen
*Assistant Examiner* — John D Bailey

(57) ABSTRACT

A system 1 for controlling a powered personal mobility vehicle 8. The system includes an input module 2, a processing unit 4, and a motor controller 7. The input module 2 receives manual triggers 3 regarding the movement of the personal mobility vehicle 8. The processing unit 4 processes a location information 5 or a distance information 6 at a given point in time, and further, either generate an automatic trigger 19, and disable or curtail the functioning of the input module 2, or enable the functioning of the input module 2. The location information 5 is defined as a location of an obstacle co-located in an environment in which the personal mobility vehicle 8 is placed or being driven, and the distance information 6 is defined as the distance of the obstacle from the vehicle 8 at a given point in time. The motor controller 7 receives and processes manual triggers 3 or automatic triggers 19 and controls movement of the personal mobility vehicle 8.

20 Claims, 10 Drawing Sheets

(56) References Cited

U.S. PATENT DOCUMENTS

| | | | | |
|---|---|---|---|---|
| 2010/0114445 | A1* | 5/2010 | Groult | B60W 40/105<br>367/93 |
| 2011/0149690 | A1* | 6/2011 | Okuda | G01S 5/22<br>367/127 |
| 2015/0025660 | A1* | 1/2015 | Prassler | A63B 24/0062<br>700/91 |
| 2015/0245962 | A1* | 9/2015 | Furuta | A61G 5/06<br>901/1 |
| 2016/0280236 | A1* | 9/2016 | Otsuka | B60W 50/10 |
| 2017/0095382 | A1* | 4/2017 | Wen | A61G 5/04 |
| 2017/0124476 | A1* | 5/2017 | Levinson | G06V 20/58 |
| 2018/0056985 | A1* | 3/2018 | Coulter | B60L 50/52 |
| 2018/0129216 | A1* | 5/2018 | Pasteau | B60L 3/0015 |
| 2018/0256422 | A1* | 9/2018 | Leaman | A61G 5/04 |
| 2018/0369035 | A1* | 12/2018 | Bhimavarapu | A61G 7/018 |
| 2019/0049968 | A1* | 2/2019 | Dean | G06T 7/292 |
| 2019/0049977 | A1* | 2/2019 | Dean | G05D 1/0244 |
| 2019/0052637 | A1* | 2/2019 | Dean | H04W 12/04 |
| 2019/0114507 | A1* | 4/2019 | Chiu | G01C 21/206 |
| 2019/0192361 | A1* | 6/2019 | Sankai | H04R 3/005 |
| 2019/0310637 | A1* | 10/2019 | Dean | G05D 1/0088 |
| 2019/0377349 | A1* | 12/2019 | van der Merwe | G05D 1/0212 |
| 2020/0163815 | A1* | 5/2020 | Puschmann | A61G 5/1078 |
| 2020/0330296 | A1* | 10/2020 | Sasai | G08G 1/16 |
| 2021/0165404 | A1* | 6/2021 | Gillett | G01C 21/3691 |

* cited by examiner

| Comment | All Clear | Obstacle in sector 0 collision zone | Obstacle in sector 1 collision zone | Obstacle in sector 2 collision zone | Obstacle in sector 3 collision zone | Obstacle in sectors 0, 1 in collision zone | Obstacle in sectors 0, 2 in collision zone | Obstacle in sectors 0, 3 in collision zone |
|---|---|---|---|---|---|---|---|---|
| Scene | 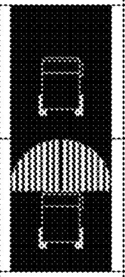 | 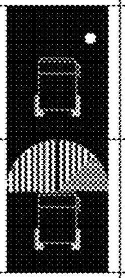 | 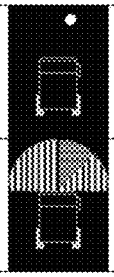 | 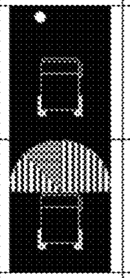 | 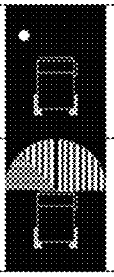 | 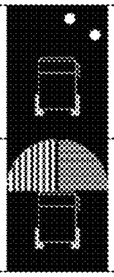 | 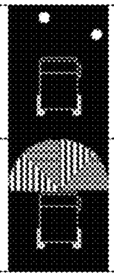 | 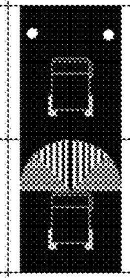 |
| Permitted Quadrants | | | | | | | | |
| Motor Controller | Go | Permit movement only in permitted quadrants. Ignore joystick inputs in non-permitted quadrants | Permit movement only in permitted quadrants. Ignore joystick inputs in non-permitted quadrants | Permit movement only in permitted quadrants. Ignore joystick inputs in non-permitted quadrants | Permit movement only in permitted quadrants. Ignore joystick inputs in non-permitted quadrants | Permit movement only in permitted quadrants. Ignore joystick inputs in non-permitted quadrants | Permit movement only in permitted quadrants. Ignore joystick inputs in non-permitted quadrants | Permit movement only in permitted quadrants. Ignore joystick inputs in non-permitted quadrants |

Fig. 8

| Comment | Obstacle in sectors 1, 2 in collision zone | Obstacle in sectors 1, 3 in collision zone | Obstacle in sectors 0, 1, 2 in collision zone | Obstacle in sectors 0, 1, 3 in collision zone | Obstacle in sectors 1, 2, 3 in collision zone | Obstacle in sectors 0, 1, 2, 3 in collision zone |
|---|---|---|---|---|---|---|
| Scene | 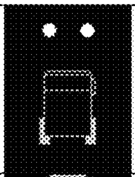 | 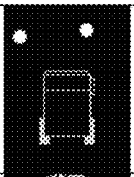 | 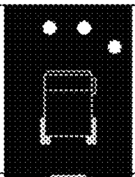 | 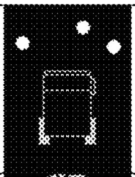 | 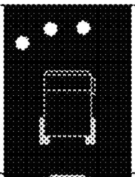 | 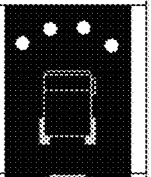 |
| Permitted Quadrants | 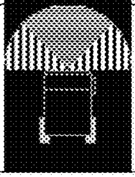 | 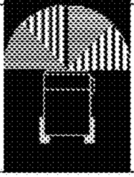 | 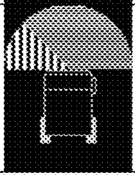 | 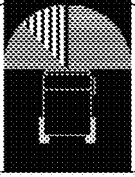 | 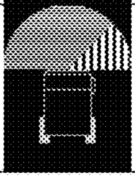 | 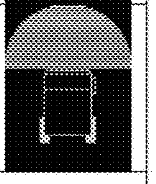 |
| Motor Controller | Permit movement only in permitted quadrants. Ignore joystick inputs in non-permitted quadrants | Permit movement only in permitted quadrants. Ignore joystick inputs in non-permitted quadrants | Permit movement only in permitted quadrants. Ignore joystick inputs in non-permitted quadrants | Permit movement only in permitted quadrants. Ignore joystick inputs in non-permitted quadrants | Permit movement only in permitted quadrants. Ignore joystick inputs in non-permitted quadrants | All stop |

Fig. 9

SYSTEM AND METHOD TO CONTROL MULTIPLE INPUTS PROVIDED TO A POWERED WHEELCHAIR

FIELD OF INVENTION

The present invention relates to controlling the movement of a personal mobility vehicle. Specifically, the invention relates to controlling a personal mobility vehicle based on sensor inputs. More specifically, the invention relates to driving the personal mobility vehicle under automated control or manual control based on sensor inputs.

BACKGROUND OF INVENTION

Personal mobility vehicles are generally driven by people with restricted or limited mobility or those with disabilities. However, to drive them sometimes requires a set of skills that takes time to master. It can be challenging for a novice user and there is a high probability that due to a lack of skill to drive the vehicle, the vehicle might collide with an obstacle. Even after appropriate time with the vehicle, the vehicle may be required to be driven in a challenging environment, either due to the layout of the airport or the congestion involved. The environment may have multiple moving obstacles, obstacles that are narrowly spaced with respect to each other, etc. These environments pose challenges to even skilled drivers, as the driver may have a perception for the obstacle which may not be appropriate, and which may result in the driver colliding with the obstacle.

Hence, a mechanism is desired where a selective control may be provided to the driver, such that if it is determined that the vehicle may collide with an obstacle, the control from the driver should be shifted to an automated means, or at least partial control should be shifted to the automated means.

OBJECTIVE OF INVENTION

The objective of the invention is to provide a mechanism for efficient control of a personal mobility vehicle between manual control and automated control so that the vehicle can be driven without collision with obstacles in an environment.

SUMMARY OF INVENTION

The objective of the invention is achieved by a system for controlling a powered personal mobility vehicle. The system includes an input module, a processing unit, and a motor controller. The input module receives manual triggers regarding the movement of the personal mobility vehicle. The processing unit processes the location information or the distance information at a given point in time, and further, either generates an automatic trigger, and disables or curtails the functioning of the input module, or enables the functioning of the input module. The location information is defined as the location of an obstacle co-located in an environment in which the personal mobility vehicle is placed or being driven, and the distance information is defined as the distance of the obstacle from the vehicle at a given point in time. The motor controller receives and processes manual triggers or automatic triggers and controls the movement of the personal mobility vehicle.

According to one embodiment of the system, the system includes one or more sensors that sense the location of one or more obstacles at a given point in time and generates the location information of the obstacle. Even though the location data may be pre-stored in a memory unit from where the processing unit may fetch it, such a mechanism is feasible only for obstacles that are static or structural in nature, and it may not work for obstacles that keep on changing their position or location. Hence, to handle control of the vehicle in such an environment, the use of sensors is helpful, as such sensors shall provide the location data of the obstacles instantaneously and the control of the vehicle can be managed based on the current location of the obstacles.

According to another embodiment of the system, the system includes one or more sensors that sense structural features in the environment in which the personal mobility vehicle is placed, and generates structural information data. The processing unit processes the structural information data and generates a planar view of the environment in which the personal mobility vehicle is located. The planar view includes the location information of the obstacle. It is relevant for the vehicle to have structural information of the environment in which it is moving. These structural features may change from time to time, specifically in a case, when the vehicle is relocated into a new environment where the vehicle is navigating for the first time. Even if there is a possibility that a person may be a regular traveler, and travels with their personal mobility vehicle, the personal mobility vehicle has to handle navigation in a new environment frequently. Most of the time, the vehicle may not have a planar view of such an environment pre-saved in its memory. In such a scenario, the sensors are helpful in providing the structural information data instantaneously, which can be useful to make a planar view of the environment in real-time.

According to yet another embodiment of the system, wherein the processing unit divides the planar view into various grids, and further determines a grade of each grid element according to a presence or a probability of the presence of one or more obstacles in the grid. The processing unit processes the grade of the grid elements to determine the location of one or more obstacles. Having such grid formation helps to provide a more granular approach in navigational planning, and shall be helpful to optimize the processing power required while navigational planning of the vehicle.

According to one element of the system, wherein the processing unit determines the distance information at a given point in time using the location information at a given point in time and the current position of the vehicle. This embodiment provides another way to determine distance information.

According to another embodiment of the system, wherein the processing unit processes the location information or the distance information, along with a direction information regarding the direction of movement of the personal mobility vehicle relative to the obstacle, and based on processing, carry out one of the generation of an automatic trigger, and disabling or curtailing of the functioning of the input module, or enabling of the functioning the input module. This embodiment is helpful to optimize the control even based on the direction of movement of the vehicle, which provides for a better user experience.

According to yet another embodiment of the system, wherein the processing unit uses a lookup table and based on the distance information of the obstacle, generates the automatic trigger related to curtailing speed or acceleration of the vehicle. The lookup table has a mapping between the distance to the obstacle from the vehicle and the speed or acceleration to be used by the vehicle. This embodiment helps to personalize the control functionality of the vehicle, as the user can make or optimize their own lookup table based on their preference, and the system can manage the control of the vehicle based on such an optimized lookup table.

According to one embodiment of the system, wherein more than one obstacle is co-located in the environment in which the personal mobility vehicle is placed or being driven, and the processing unit generates a list of obstacles sorted based on the distance information and location information, and the processing unit processes the list of obstacles to determine the nearest obstacles related to the direction of movement of the vehicle, and further lookups into the lookup table based on the distance information of the nearest obstacle, and generates an automatic trigger related to curtailing of speed or acceleration of the vehicle. This embodiment provides a more sophisticated system for controlling the vehicle, as it prioritizes obstacles in the direction of movement of the vehicle at the time of control planning and execution.

According to another embodiment of the system, the system includes a direction sensor that senses the direction of movement of the vehicle and generates the direction information. This helps in providing a sophisticated mechanism for determining the direction information.

According to yet another embodiment of the system, wherein the input module is a pointing device and provides direction pointers as manual triggers, and the processing unit receives and processes the manual triggers to determine the direction information. This embodiment provides another mechanism to determine the direction of movement of the vehicle.

According to one embodiment of the system, wherein the direction of movement of the vehicle is divided into multiple sectors around the vehicle, and direction information shall relate to the movement of the vehicle in one of the sectors. This provides for a granular approach to determine the direction of the vehicle, and helps optimize computational requirements for determining the direction of movement of the vehicle, and further optimize the computational power while such sector-based information is used while planning and executing navigational controls.

According to another embodiment of the system, wherein the processing unit disables or curtails the functioning of the input module for movement of the vehicle in a particular sector where the obstacle is located. This approach for controlling the movement of the vehicle based on sectors shall help in optimizing computational loads while controlling planning and execution.

According to yet another embodiment of the system, wherein the processing unit, thereafter, lookup into a lookup table based on the distance information of the obstacle, and generates the automatic trigger related to curtailing of speed or acceleration of the vehicle based on the distance of the obstacle in the particular sector. The lookup table has a mapping between the distance of the obstacle from the vehicle and a speed or acceleration to be followed. Considering the distance to the object and also the sector information about the movement of the vehicle, provides for efficient control movement while keeping the computational requirements low due to granular considerations of the geographical features.

The objective of the invention is also achieved by a computer program product, which is stored onto a non-transitory storage medium. The computer program product on execution onto one or more processors, enable one or more processors to perform the processing of location information or distance information at a given point in time, and based on processing the location information or the distance information, carry out one of the following: generating an automatic trigger, and disabling or curtailing a functioning of the input module, or enabling the functioning of the input module. Further, one or more processors are enabled to receive and process manual triggers or automatic triggers and control the movement of the personal mobility vehicle. The location information is defined as a location of an obstacle co-located in an environment in which the personal mobility vehicle is placed or being driven, and the distance information is defined as the distance of the obstacle from the vehicle at a given point in time.

BRIEF DESCRIPTION OF DRAWINGS

FIGS. 8 and 9 illustrate a tabular view which details the movement of the vehicle with respect to the presence of obstacles in different sectors of the planar area.

Figure 1:
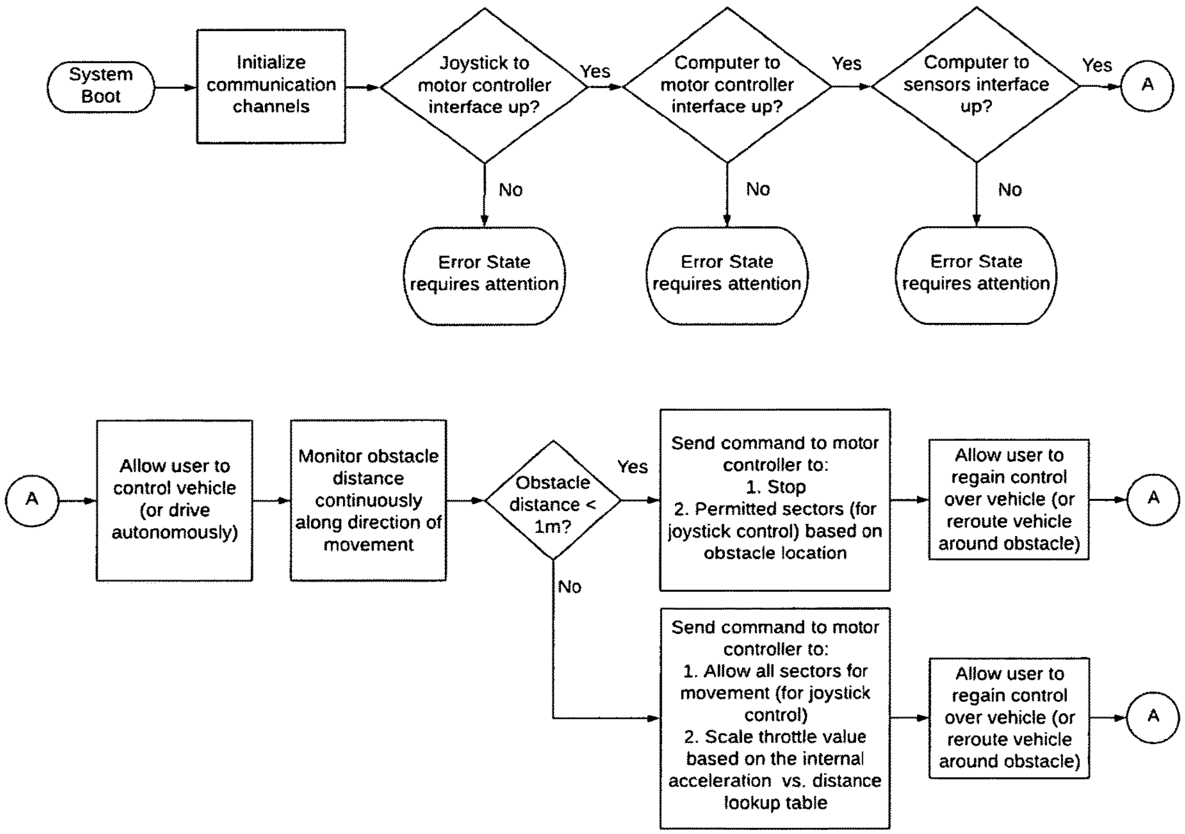
FIG. 1 illustrates a flowchart regarding the determination and application of control to manual triggers based on the distance between a personal mobility vehicle and one or more obstacles.

The figures depict embodiments of the disclosure for purposes of illustration only. One skilled in the art will readily recognize from the following description that alternative embodiments illustrated herein may be employed without departing from the principles of the disclosure described herein.

DETAILED DESCRIPTION

The best and other modes for carrying out the present invention are presented in terms of the embodiments, herein depicted in the drawings provided. The embodiments are described herein for illustrative purposes and are subject to many variations. It is understood that various omissions and substitutions of equivalents are contemplated as circumstances may suggest or render expedient, but are intended to cover the application or implementation without departing from the spirit or scope of the present invention. Further, it is to be understood that the phraseology and terminology employed herein are for the purpose of the description and should not be regarded as limiting. Any heading utilized within this description is for convenience only and has no legal or limiting effect.

The terms “a” and “an” herein do not denote a limitation of quantity, but rather denote the presence of at least one of the referenced items.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more sub-systems or elements or structures or components preceded by "comprises . . . a" does not, without more constraints, preclude the existence of other, sub-systems, elements, structures, components, additional sub-systems, additional elements, additional structures or additional components. Appearances of the phrase "in an embodiment", "in another embodiment" and similar language throughout this specification may, but not necessarily do, all refer to the same embodiment.

This invention discloses a system and method for controlling a personal mobility vehicle. The personal mobility vehicle is controlled through manual triggers and automatic triggers selectively. The manual trigger is disabled when the personal mobility vehicle is within a predefined distance from an obstacle, and the automatic trigger is enabled. In furtherance, the manual trigger is curtailed for acceleration based on a distance between the nearest obstacle and the vehicle.

In one exemplary embodiment, for implementation of the invention, a planar view is created based on inputs received from various sensors placed on the vehicle. The planar view is created by dividing the whole plane on which the vehicle is traversing into various grid elements, and each grid element is graded with respect to the presence of the obstacle.

In furtherance, the distance of the vehicle with respect to each of the obstacles is further generated at a given point in time, so that the processing unit of the system can determine the level of control required on the manual trigger.

This invention details how the manual triggers and the automatic trigger may be combined to provide a seamless experience. For explanation purposes, the references are made to personal mobility vehicles and wheelchairs interchangeably, as the invention has implementations both in a powered wheelchair, as well as, a powered personal mobility vehicle.

Figure 10:
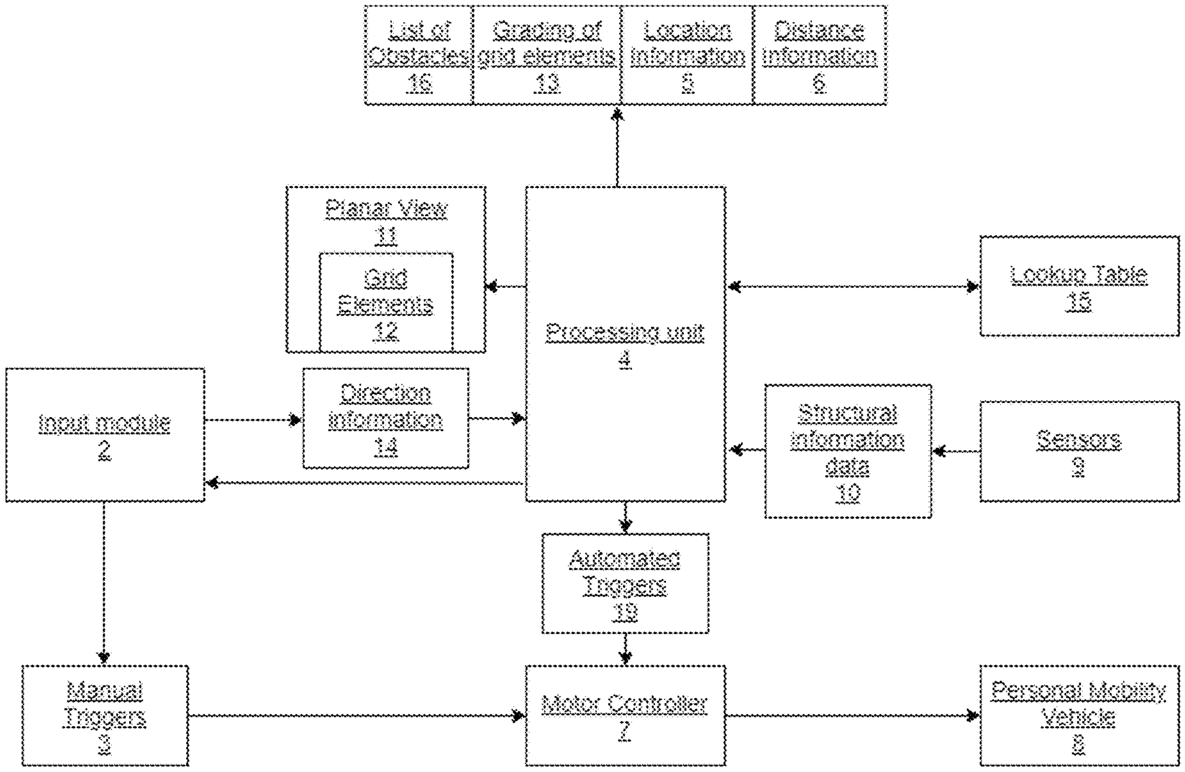
FIG. 10 illustrates a schematic diagram of a system for controlling a powered personal mobility vehicle according to an exemplary embodiment of the invention.

Further, the invention is explained through an exemplary system 1 of FIG. 10. While explaining FIG. 10, references to FIGS. 1-9 shall also be made, and FIGS. 1-9 shall also be explained. The system 1 includes the personal mobility vehicle 8, a processing unit 4, a motor controller 7, sensors 9, and an input module 2, which cooperates together to control the movement of the vehicle 8 while navigating in an environment.

The processing unit 4 processes the location information 5, along with the direction information 14 and further, either generate an automatic trigger 19, and disable or curtail functioning of the input module 2, or enable functioning of the input module 2. The location information 5 is defined as a location of an obstacle co-located in an environment in which the personal mobility vehicle 8 is placed or being driven. The processing unit 4 may further use this location information 5 to generate a distance information 6 regarding the distance of the obstacle from the vehicle at a given point in time, and can use further this distance information 6 along with the direction information 14 to further control movement of the vehicle 8.

In another alternate embodiment, the direction information 14 of movement of the vehicle 8 may not be used, rather the processing unit 4 just processes the location information 5 or the distance information 6 to control the movement of the vehicle 8. This embodiment is specifically useful, where lower power computation resources are provided.

The input module 2 can be a physical joystick, any other pointing device, a virtual joystick in the form of a touch-sensitive device, or a remote control mechanism not attached to the vehicle 8. The input module 2 receives manual triggers regarding the movement of the personal mobility vehicle 8.

The motor controller 7 receives and processes manual triggers 3 or automatic triggers 19 and controls movement of the personal mobility vehicle 8.

The input module 2 provides direction pointers as manual triggers 3. These direction pointers are further processed by the processing unit 4 to generate the direction information 14 regarding the direction of movement of the vehicle 8. In an alternate embodiment, a direction sensor can be used which can sense the direction of movement of the vehicle, and generates the direction information 14 of the vehicle 8.

The sensors 9 included are a collection of long and/or short-range sensors. The structural information data 10 generated from the sensors 9 are further processed by the processing unit 4 to generate a planar view 11 of the scene surrounding the wheelchair 8, as shown FIG. 3. While the planar view ignores the height (y) of the obstacles, each grid element in this view corresponds to the likelihood of an obstacle being present. Each such grid element corresponds to a physical x and z location in the real world, which is the location information of the obstacle 18. The manner in which these grid elements are populated is a function of the types of sensors used, their resolution, and update rates.

Figure 3:
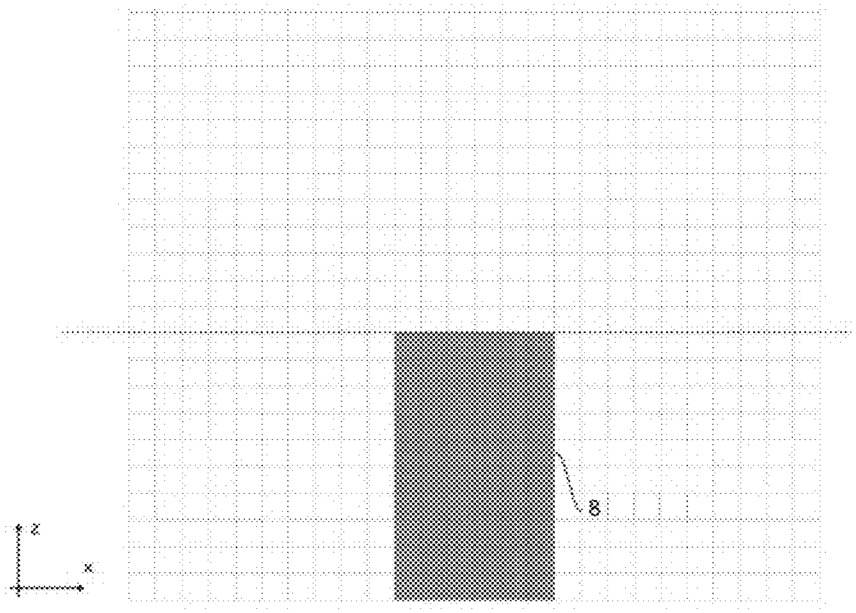
FIG. 3 illustrates a planar area divided in grids with personal mobility vehicles capturing a grid area.

For example, in FIG. 3, if we denote the wheelchair 8 with the grey rectangle, the remainder of the scene may be divided into grid elements of interest identified with their coordinates as (x, z). The arrangement of the grid elements could be in an orthogonal space, a hexagonal space or even a polar representation. For the purposes of explaining this FIG. 3, the grid elements are shown in an orthogonal Euclidean space. For the sake of illustration, only the forward and side facing grid elements are shown, but one can envision equivalent grid elements on the rear side of the wheelchair 8 as well. Each grid element can take a value between 0 and 1 (or an arbitrary integer scale of 0 to 255 or some such digital representation. A value of 1 would denote the absence of an obstacle and a value of 0 would represent that there is an obstacle 18 that entirely occupies that grid element. A number between 0 and 1 would denote one of the following: a probability factor of an obstacle 18 being present, or denote that only part of the grid element is occupied by an obstacle 18, or denote a change in the state of the grid element as moving obstacles 18 enter and exit that the grid elements. The choice of 0 and 1 denoting the presence or absence of an obstacle 18 is entirely arbitrary. The choices could easily be reversed with 0 denoting the absence and 1 denoting the presence of and obstacle 18. The choice used here is merely for illustrative and print purposes.

Figure 4:
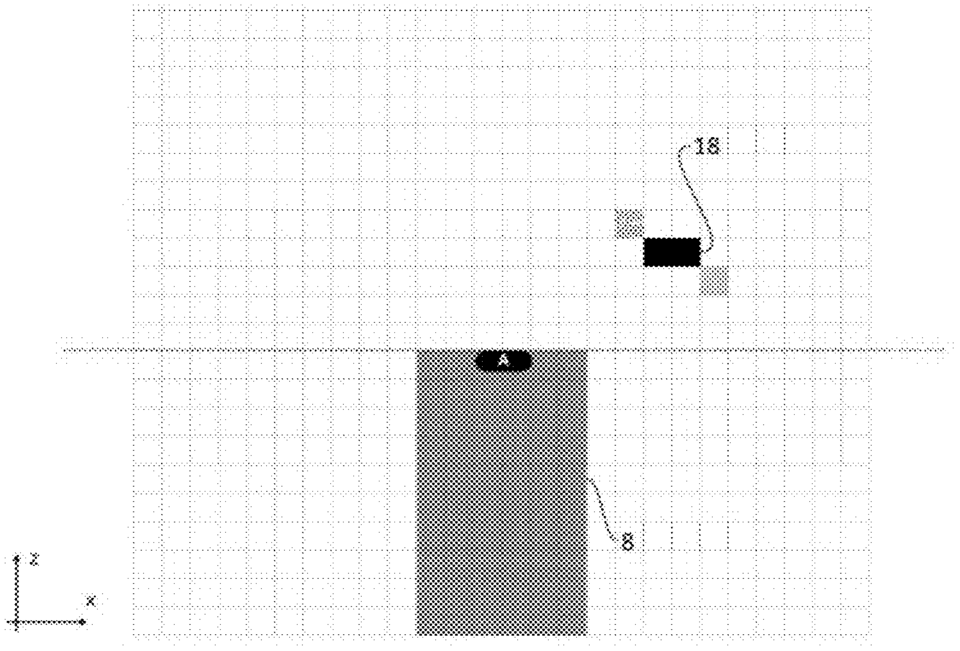
FIG. 4 illustrates the planar area with an obstacle present in the area.

As another example, in FIG. 4, there is clearly an obstacle 18 present in the forward right-hand side of the wheelchair 8. Some of the grid elements are solid black (denoting 0) and some others are shades of grey denoting that they are partially occupied.

Such a representation of the scene allows for a mechanism to recognize the size and distance of the obstacles 18 and allows the wheelchair 8 to determine a remedial course of action to avoid the collision.

Figure 5:
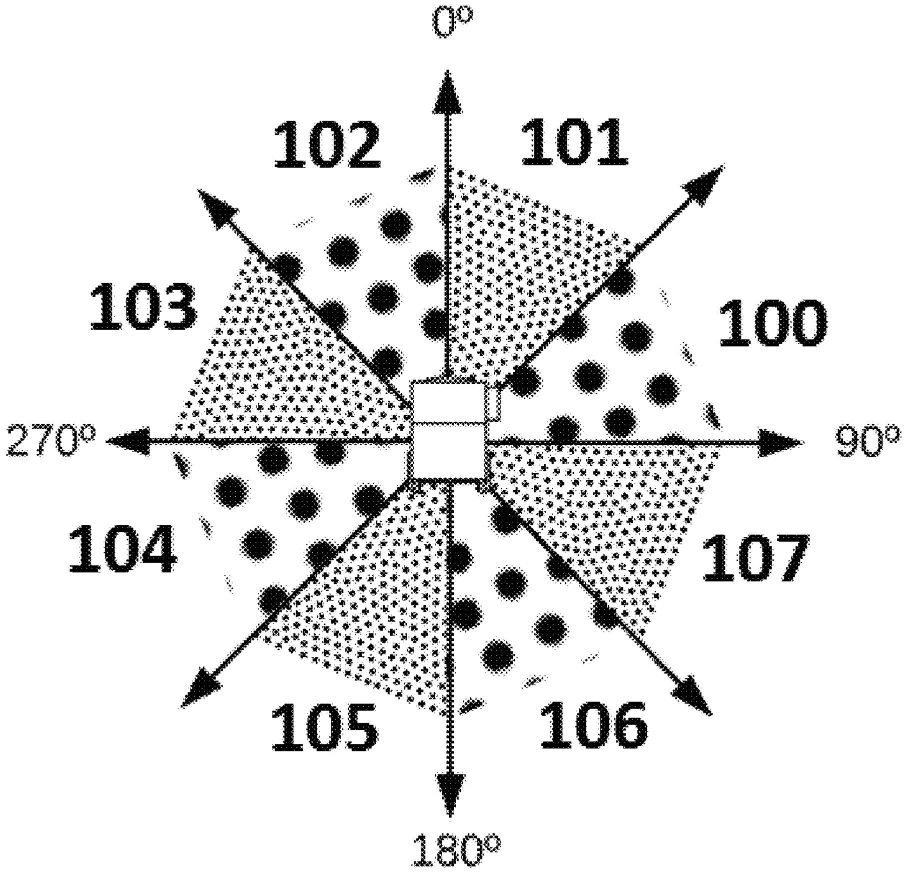
FIG. 5 illustrates the planar area divided into various segments for the motion of the vehicle.

In furtherance, the plane for motion for the wheelchair 8 is divided by the processing unit into a collection of sectors 100, 101, 102, 103, 104, 105, 106, 107, as shown in FIG. 5, that governs the positions of the joystick 2 which in turn determines the direction of movement of the wheelchair 8. In FIG. 5, the space of possible movement is divided into eight sectors 100, 101, 102, 103, 104, 105, 106, 107 with the wheelchair in the middle. Sector 100 corresponds to the position of the joystick 2 (and hence wheelchair movement in that sector) between 45° and 90° to the right from the forward-facing normal (the forward 0° vector). Similarly, sector 105 corresponds to the position of the joystick 2 (and hence wheelchair movement in that sector) between 180° and 225° to the left from the reverse facing normal (the 180° vector). Similarly, other sectors are shown for the position of the joystick 2, and movement of the wheelchair in that sector.

Now that the space of all possible movement of the wheelchair 8 can be segmented, this segmentation can be used to determine which sectors are permitted to have movement and which are not. The division into eight sectors is shown simply as an example and one can easily envision this space being broken down into two sectors (forward and reverse only), four sectors (a quadrant-like segmentation) or in the extreme a space of 360 1° sectors with each sector corresponding to movement along that particular integer directional vector.

Figure 6:
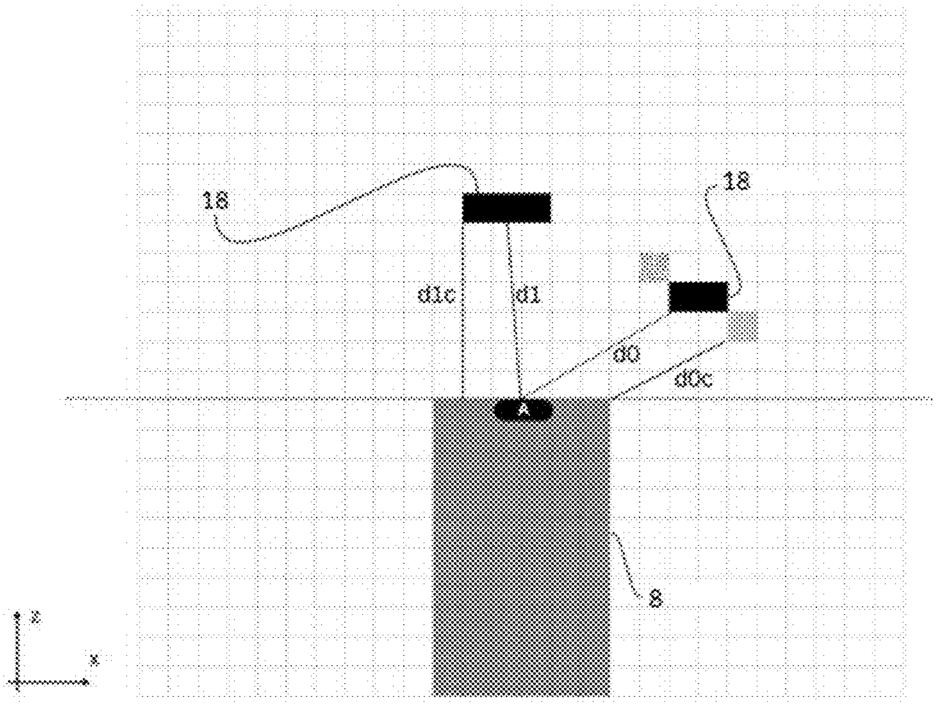
FIG. 6 illustrates the planar area illustrating the distance between the vehicle and different obstacles.

With the plane of possible movements divided into sectors and the space of possible physical locations divided into grid elements, it is now possible to compute distances of obstacles from the wheelchair 8. FIG. 6 is a representative scenario with two examples of obstacles 18. The distance d0 and d1 to the obstacle 18 can be computed in the following means:

Minimum distance between the collection of grid elements representing the "wheelchair" 8 and the collection of grid elements representing the obstacle 18. This is denoted with d0*c* and d1*c* meant to represent the closest distance between the two sets of grid elements distance from the center of the wheelchair's forward most point and the centroid of the obstacle 18. This is denoted by d0 and d1

The closest distance d0*c* and d1*c* shall be the point of concern while navigation planning where the maximum likelihood of collision between the vehicle 8 and the obstacles 18 exists. The manner in which these distances are computed could either consider obstacles as contiguous sets of grid elements that require segmentation and some form of connected component analysis or very simply with each grid element being a unique obstacle. The latter is a computationally faster approach as it does not particularly concern itself with the size of an obstacle but rather with the fact that it is present or absent. There can be any other mechanism used where the distance of the wheelchair 8 from the obstacle 18 can be identified using the location information.

Figure 2:
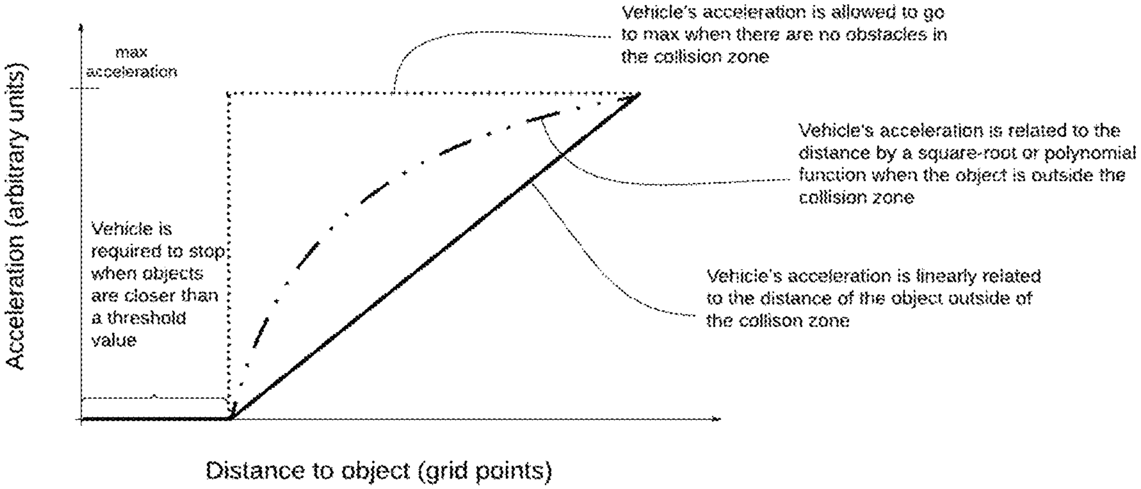
FIG. 2 illustrates a graphical representation of the distance of the vehicle with respect to the obstacles and the acceleration to be enabled for the movement of the vehicle.

Depending upon the distance between the wheelchair 8 and the obstacle(s), a list 16 of obstacles is created by the processing unit 4, on a frame by frame basis, and the speed of the wheelchair 8 can be computed such that the movement of the wheelchair 8 is smooth. A frame denotes the smallest time segment for computation. Distance to the closest obstacle 18 is chosen when considering how the vehicle's speed needs to be adjusted. For every computational frame, a list 16 of obstacles is generated by the processing unit 4, and further sorted in order of distance. For each obstacle and distance, a lookup table 15 is used or the permitted speed of the wheelchair 8 is computed. For example, a graph of acceleration versus distance can be used as one of the three examples as shown in FIG. 2. This graph is a plot of distance versus acceleration. In other words, speed is a resultant of a combination of multiple factors including the slope of the surface, the throttle position (representative of acceleration), the battery capacity. Acceleration is maintained in a closed-loop manner by the motor controller 7 based on the distance traveled and adjusted to maintain the speed limits of the wheelchair 8. It is pertinent to be noted that the list 16 of obstacles may only be required when there is more than one obstacle co-located in the field of view of the sensors 9.

The fusion of the manual triggers 3 and automatic triggers 19 is done in two stages. In stage 1, permitted sectors are determined. In stage 2, the permitted acceleration values are determined.

Figure 7:
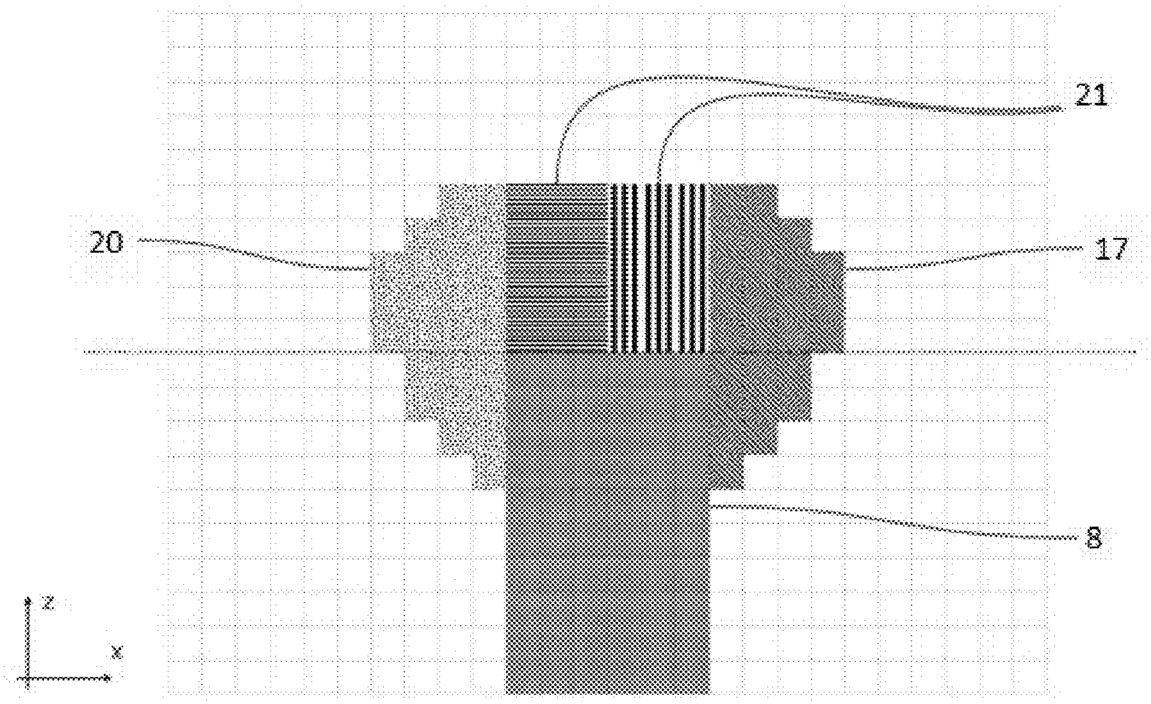
FIG. 7 illustrates the planar view with the vehicle, and different regions of potential collision if one or more obstacles are present in those regions.

The regions of interest for determining collision are shown in FIG. 7, The regions are represented as a region of potential collision on right turn 17, regions of potential collision in forward movement 21, and region of potential collision on left turn 20. A similar chart exists for reverse direction, but only forward motion sectors are shown in the illustrations in FIG. 7.

Further FIGS. 8 and 9 illustrate a tabular view which details the movement of the vehicle with respect to the presence of the obstacles in different sectors of the planar area. The critical point to note here is that the aspects of speed do not get incorporated here and it is simply a measure of collision avoidance that is obtained through this "permitted quadrant" approach.

The computer-generated acceleration is a function of the proximity to obstacles combined with the prescribed path of the vehicle 8. The issue of combining it with the human-generated interrupts via the joystick is further illustrated in FIG. 1. The motor controller 7 runs primarily with the joystick 2 (or external accessory device) as the primary thread on the system with the computer-generated direction commands/automatic triggers 19 running in slave mode. Any time that there is a movement on the joystick 2 (or an external accessory device), computer commands 19 are ignored and the joystick commands 3 are given priority. This is to ensure that any input from the user serves as a non-maskable interrupt. The flowchart illustrated in FIG. 1 describes an example where 1 m distance between the obstacle and the wheelchair 8 is used as an illustrative threshold value.

In one embodiment, further to ensure that the rider always has final control over the vehicle's movements, the vehicle also has a stop button that can be triggered at any time to override the autonomous movement selected by the computer.

LIST OF REFERENCE SIGNS

- 1. System
- 2. Input module/Joystick
- 3. Manual triggers/Joystick commands
- 4. Processing unit
- 5. Location information
- 6. Distance information
- 7. Motor controller
- 8. Personal mobility vehicle/wheelchair
- 9. Sensors
- 10. Structural information data
- 11. Planar view
- 12. Grid elements
- 13. Grade of the grid elements
- 14. Direction information
- 15. Lookup table
- 16. List of obstacles
- 17. Region of potential collision on right turn
- 18. Obstacle

19. Automatic triggers/computer commands
20. Region of potential collision on left turn,
21. Region of potential collision on forward movement
100, 101, 102, 103, 104, 105, 106, 107. Sectors of movement of the vehicle

The invention claimed is:

1. A system for controlling a powered personal mobility vehicle, comprising:

an input module adapted to receive a manual trigger regarding the movement of the powered personal mobility vehicle;

a processing unit adapted to process a location information or a distance information at a given point in time, wherein the location information is defined as a location of one or more obstacles co-located in an environment in which the powered personal mobility vehicle is placed or being driven, and wherein the distance information is defined as distance of the one or more obstacles from the powered personal mobility vehicle at a given point in time and based on processing the location information or the distance information, to carry out one of the following:

generate an automatic trigger, and disable or curtail functioning of the input module, or enable the functioning of the input module, a motor controller adapted to receive and process the manual trigger or the automatic trigger and adapted to control the movement of the powered personal mobility vehicle based on the manual trigger or the automatic trigger selectively;

one or more sensors adapted to sense structural features in the environment in which the powered personal mobility vehicle is placed, and adapted to generate structural information data based on the structural features, wherein the structural features change from time to time, wherein the processing unit is adapted to process the structural information data and to generate a planar view of the environment in which the powered personal mobility vehicle is located, wherein the planar view comprises the location information of the one or more obstacles; and the processing unit adapted to divide the planar view into a plurality of grid elements, and to determine a grade of each grid element from the plurality of grid elements according to a presence of the one or more obstacles or probability of the presence of the one or more obstacles in the plurality of grid elements, wherein the manual trigger is disabled when the powered personal mobility vehicle is within a predefined distance from the one or more obstacles, and the manual trigger is curtailed for acceleration based on the distance between a nearest obstacle from the one or more obstacles and the powered personal mobility vehicle, wherein the distance of the powered personal mobility vehicle with respect to each obstacle from the one or more obstacles is generated at a given point in time, so that the processing unit determines a level of control required on the manual trigger, and wherein the automatic trigger is enabled when the powered personal mobility vehicle is not within the predefined distance from the one or more obstacles.

2. The system as claimed in claim 1, wherein the processing unit is adapted to process the location information or the distance information, along with a direction information regarding direction of movement of the powered personal mobility vehicle relative to the one or more obstacles, and based on processing, to carry out one of the following:

generate the automatic trigger, and disable or curtail functioning of the input module, or enable the functioning of the input module.

3. The system as claimed in claim 2, wherein the direction of movement of the powered personal mobility vehicle is divided into multiple sectors around the powered personal mobility vehicle, and direction information relates to the movement of the powered personal mobility vehicle in one of the sectors.

4. The system as claimed in claim 3, wherein the processing unit is adapted to disable or curtail the functioning of the input module for movement of the powered personal mobility vehicle in a particular sector from the multiple sectors where the one or more obstacles are located.

5. The system as claimed in claim 4, wherein the processing unit, thereafter, is adapted to lookup into a lookup table based on the distance information of the one or more obstacles, and generate the automatic trigger related to adjusting speed or acceleration of the powered personal mobility vehicle based on the distance of the one or more obstacles in the particular sector, wherein the lookup table has a mapping between distance of the one or more obstacles from the powered personal mobility vehicle and speed or acceleration to be followed.

6. The system as claimed in claim 2, wherein the processing unit is adapted to lookup into a lookup table based on the distance information of the one or more obstacles, and generate the automatic trigger related to adjusting speed or acceleration of the powered personal mobility vehicle, wherein the lookup table has a mapping between the distance of the one or more obstacles from the powered personal mobility vehicle and speed or acceleration to be used.

7. The system as claimed in claim 6, wherein more than one obstacle is co-located in the environment in which the powered personal mobility vehicle is placed or being driven, and the processing unit is adapted to generate a list of obstacles sorted out based on the distance information and the location information of each obstacle, and the processing unit is adapted to process the list of obstacles to determine the nearest obstacle related to the direction of movement of the powered personal mobility vehicle, and further adapted to lookup into the lookup table based on the distance information of the nearest obstacle, and to generate the automatic trigger related to the adjusting speed or acceleration of the powered personal mobility vehicle.

8. The system as claimed in claim 2 comprising:

a direction sensor adapted to sense the direction of movement of the powered personal mobility vehicle and adapted to generate the direction information.

9. The system as claimed in claim 2, wherein the input module is a pointing device and adapted to provide direction pointers as the manual trigger, and the processing unit is adapted to receive and process the manual trigger to determine the direction information.

10. The system according to claim 1, wherein the one or more sensors are at least one of: a long-range sensor and a short-range sensor.

11. The system according to claim 1, wherein the input module is a remote control mechanism not attached to the powered personal mobility vehicle.

12. The system as claimed in claim 1, wherein the system comprises a stop button that is triggered at any time to override an autonomous movement selected by the automatic trigger.

13. The system as claimed in claim 1, wherein the processing unit is adapted to determine the distance information at a given point in time using the location information at a given point in time and a current position of the powered personal mobility vehicle.

14. A computer program product, stored onto a non-transitory medium, on execution onto one or more processors, enable the one or more processors to perform the following:

processing a location information or a distance information at a given point in time, wherein the location information is defined as a location of one or more obstacles co-located in an environment in which the powered personal mobility vehicle is placed or being driven, and the distance information is defined as distance of the one or more obstacles from the powered personal mobility vehicle at a given point in time and based on processing the location information or the distance information, to carry out one of the following:

generating an automatic trigger, and disabling or curtailing a functioning of the input module, or enabling the functioning of the input module, receiving and processing the manual trigger or the automatic trigger, and controlling movement of the powered personal mobility vehicle based on the manual trigger or the automatic trigger selectively; and sensing structural features in the environment, by using one or more sensors coupled with the one or more processors, in which the powered personal mobility vehicle is placed, wherein the one or more processors are adapted to generate structural information data, wherein the structural features change from time to time, wherein the one or more processors are adapted to process the structural information data and to generate a planar view of the environment in which the powered personal mobility vehicle is located, wherein the planar view comprises the location information of the one or more obstacles;

wherein the one or more processors are adapted to divide the planar view into a plurality of grid elements, and to determine a grade of each grid element from the plurality of grid elements according to the presence of the one or more obstacles or probability of the presence of the one or more obstacles in the plurality of grid elements, wherein the manual trigger is disabled when the powered personal mobility vehicle is within a predefined distance from the one or more obstacles, and the manual trigger is curtailed for acceleration based on the distance between a nearest obstacle from the one or more obstacles and the powered personal mobility vehicle, wherein the distance of the powered personal mobility vehicle with respect to each obstacle from the one or more obstacles is generated at a given point in time, so that the one or more processors determine a level of control required on the manual trigger, and wherein the automatic trigger is enabled, when the powered personal mobility vehicle is not within the predefined distance from the one or more obstacles.

15. The computer program product according to claim 14, wherein the one or more processors are further enabled to:

process the location information or the distance information, along with a direction information, wherein the direction information is related to a direction of movement of the powered personal mobility vehicle relative to the one or more obstacles, and based on processing, to carry out one of the following:

generate the automatic trigger, and disable or curtail functioning of the input module, or enable the functioning of the input module.

16. The computer program product according to claim 15, wherein the one or more processors are further enabled to:

lookup into a lookup table based on the distance information of the one or more obstacles, and generate the automatic trigger related to adjusting speed or acceleration of the powered personal mobility vehicle, wherein the lookup table has a mapping between the distance of the one or more obstacles from the powered personal mobility vehicle and a speed or acceleration to be used.

17. The computer program product according to claim 16, wherein more than one obstacle is co-located in the environment in which the powered personal mobility vehicle is placed or being driven, and the one or more processors are further enabled to:

generate a list of obstacles sorted out based on the distance information and the location information of each obstacle, process the list of obstacles to determine the nearest obstacle related to the direction of movement of the powered personal mobility vehicle, lookup into the lookup table based on the distance information of the nearest obstacle, and generate the automatic trigger related to adjusting the speed or acceleration of the powered personal mobility vehicle.

18. The computer program product according to claim 15, wherein the direction of movement of the powered personal mobility vehicle is divided into multiple sectors around the powered personal mobility vehicle, and direction information relates to the movement of the powered personal mobility vehicle in one of the sectors, and the one or more processors are further enabled to disable or curtailing the functioning of the input module for movement of the powered personal mobility vehicle in a particular sector where the one or more obstacles are located.

19. The computer program product according to claim 18, wherein the one or more processors are further enabled to:

lookup into a lookup table based on the distance information of the one or more obstacles, and generate the automatic trigger related to adjusting speed or acceleration of the powered personal mobility vehicle based on the distance of the one or more obstacles in the particular sector, wherein the lookup table has a mapping between distance of the one or more obstacles from the powered personal mobility vehicle and speed or acceleration to be followed.

20. A method for controlling a powered personal mobility vehicle, comprising:

processing a location information or a distance information at a given point in time by using a processing unit, wherein the location information is defined as a location of one or more obstacles co-located in an environment in which the powered personal mobility vehicle is placed or being driven, and the distance information is defined as distance of the one or more obstacles from the powered personal mobility vehicle at a given point in time, and based on processing the location information or the distance information, to carry out one of the following:

generating an automatic trigger, and disabling or curtailing a functioning of an input module, or enabling the functioning of the input module, receiving and processing the manual trigger or the automatic trigger, and controlling movement of the powered personal mobility vehicle, wherein the manual trigger is generated by providing inputs manually onto the input module;

sensing structural features in the environment, by using one or more sensors, in which the powered personal mobility vehicle is placed, wherein the structural features change from time to time;

generating structural information data based on the structural features;

processing the structural information data to generate a planar view of the environment, by using the processing unit, in which the powered personal mobility vehicle is located, wherein the planar view comprises the location information of the one or more obstacles;

dividing the planar view into a plurality of grid elements by using the processing unit; and determining a grade of each grid element from the plurality of grid elements according to the presence of the one or more obstacles or probability of the presence of the one or more obstacles in the plurality of grid elements, by using the processing unit;

wherein the manual trigger is disabled when the powered personal mobility vehicle is within a predefined distance from the one or more obstacles, and the manual trigger is curtailed for acceleration based on the distance between a nearest obstacle from the one or more obstacles and the powered personal mobility vehicle, wherein the distance of the powered personal mobility vehicle with respect to each obstacle from the one or more obstacles is generated at a given point in time, so that the processing unit determines a level of control required on the manual trigger, and wherein the automatic trigger is enabled, when the powered personal mobility vehicle is not within the predefined distance from the one or more obstacles.

* * * * *